US012659054B2

(12) United States Patent
Liu et al.

(10) Patent No.: US 12,659,054 B2
(45) Date of Patent: Jun. 16, 2026

(54) DATA TRANSMISSION EFFICIENCY ANALYZING METHOD, SYSTEM THEREOF AND COMPUTER READABLE RECORDING MEDIUM

(71) Applicant: Microip Inc., Mahe (SC)

(72) Inventors: Pei-Ying Liu, Hsinchu City (TW); Cheng-Hsuan Tsai, Taoyuan City (TW)

(73) Assignee: Microip Inc., Mahe (SC)

( * ) Notice: Subject to any disclaimer, the term of this patent is extended or adjusted under 35 U.S.C. 154(b) by 389 days.

(21) Appl. No.: 18/415,609

(22) Filed: Jan. 17, 2024

(65) Prior Publication Data

US 2024/0243819 A1     Jul. 18, 2024

Related U.S. Application Data

(60) Provisional application No. 63/480,487, filed on Jan. 18, 2023.

(30) Foreign Application Priority Data

Nov. 6, 2023     (TW) .................................. 112142712

(51) Int. Cl.
    *H04B 17/11*          (2015.01)
    *H04B 17/10*          (2015.01)
    *H04B 17/18*          (2015.01)
(52) U.S. Cl.
    CPC ........... *H04B 17/18* (2015.01); *H04B 17/101* (2015.01)
(58) Field of Classification Search
    CPC ............................... H04B 17/11; H04B 17/101
    See application file for complete search history.

(56) References Cited

U.S. PATENT DOCUMENTS 6,397,228 B1 *  5/2002  Lamburt ............. G06F 16/2365
                                                 707/999.203
8,650,209 B1 *  2/2014  Shattah ................. G06F 16/215
                                                 707/770

(Continued)

FOREIGN PATENT DOCUMENTS

KR        20110085452 A      7/2011
WO         2022141250 A1     7/2022

*Primary Examiner* — Henry Tsai
*Assistant Examiner* — Christopher A Daley
(74) *Attorney, Agent, or Firm* — CKC & Partners Co., LLC

(57)          ABSTRACT

A data transmission efficiency analyzing method includes performing a recording step, a data stream storing step, a comparing step and an efficiency calculating step. The recording step includes reading or writing a plurality of data transmission behaviors. The data stream storing step includes storing the data transmission behaviors, and outputting one of a part of the data transmission behaviors to combine the one of the part of the data transmission behaviors into a data stream. The comparing step includes comparing connecting port codes, time values, terminal nodes and data transmission amounts of each of the data streams with a transmitting port, a transmitting time, a receiving port and a data amount of a data of a transmission instruction to determine whether each of the data streams is corresponding to one of the connecting port codes. The efficiency calculating step includes calculating a transmission efficiency of the transmission instruction.

15 Claims, 16 Drawing Sheets

<u>100</u>

(56)             References Cited

U.S. PATENT DOCUMENTS

| | | | |
|---|---|---|---|
| 9,633,134 B2 * | 4/2017 | Ross | G06F 16/9577 |
| 11,770,025 B2 * | 9/2023 | Jiang | H02J 50/12 |
| | | | 307/104 |
| 2005/0102445 A1 | 5/2005 | Jang | |
| 2015/0008753 A1 * | 1/2015 | Park | H03H 7/40 |
| | | | 307/104 |
| 2016/0355095 A1 * | 12/2016 | Okamoto | B60L 53/305 |
| 2021/0152031 A1 * | 5/2021 | Kobayashi | H02J 50/10 |

* cited by examiner

100

S01 Recording step

S02 Data stream storing step

S03 Comparing step

S04 Efficiency calculating step

100a

S11

Recording step

S12

Data stream storing step

S121

Data stream calculating step

S13

Comparing step

S14

Efficiency calculating step

S141

Analyzing time assigning step

| Sequence number | Node code | TID | address | TTL | FAR | FAT | ABH |
|---|---|---|---|---|---|---|---|
| 1 | 31 | 0 | 0x78500014 | 800 | 20 | -1 | -1 |
| 2 | 68 | 0 | 0x7850002c | 800 | 20 | -1 | -1 |
| 3 | 103 | 0 | 0x78500044 | 800 | 20 | -1 | -1 |

Start Time=16040
ADDR=0x78500014 HWRITE=1 HSIZE=2 HBURST=0
HPROT=0 HNONSEC=0 HEXCL=0
Read Bandwidth A=1.43 Read Bandwidth B=1.52
Violation rule:
1.TTL<200,TTL=800

Fig. 14

DATA TRANSMISSION EFFICIENCY ANALYZING METHOD, SYSTEM THEREOF AND COMPUTER READABLE RECORDING MEDIUM

RELATED APPLICATIONS

This application claims priority to U.S. Provisional Application Ser. No. 63/480,487, filed Jan. 18, 2023 and Taiwan Application Serial Number 112142712, filed Nov. 6, 2023, which is herein incorporated by reference.

BACKGROUND

Technical Field

The present disclosure relates to a data transmission efficiency analyzing method, a system thereof and a computer readable recording medium. More particularly, the present disclosure relates to a data transmission efficiency analyzing method, a system thereof and a computer readable recording medium, crossing multiple buses.

Description of Related Art

Due to the increase of the efficiency and the functions of the conventional System On a Chip (SOC), the circuit complexity of the SOC also increases, the data transmission between nodes and different buses are more common. However, the conventional efficiency analyzing method can only calculate the efficiency between two nodes according to a transmitting time, a receiving time and a transmitting data amount between the two nodes. If a data transmission has crossed more than two nodes or even crossed between different bus interfaces, the conventional efficiency analyzing method cannot calculate the specific beginning time and the ending time of the transmission, hence, the actual efficiency of the data transmission cannot be calculated accurately.

Therefore, a data transmission efficiency analyzing method, a system thereof and a computer readable recording medium which can connect a data stream between nodes to calculate a data transmitting efficiency crossed different nodes and buses are commercially desirable.

SUMMARY

According to one aspect of the present disclosure, a data transmission efficiency analyzing method is configured to calculate a transmission efficiency of a transmission instruction. The transmission instruction is configured to control a transmitting port to transmit a data to a receiving port along a transmission route at a transmitting time. The transmission route has a plurality of connecting port codes. The data transmission efficiency analyzing method includes performing a recording step, a data stream storing step, a comparing step and an efficiency calculating step. The recording step includes configuring a processing unit to read or write a plurality of data transmission behaviors between a plurality of nodes from a memory unit, and generate a transmission recording table according to the data transmission behaviors. The transmission recording table includes each of the connecting port codes, a time value, a timestamp, a terminal node and a data transmission amount, which are corresponding to each of the data transmission behaviors. The data stream storing step includes configuring the processing unit to store the data transmission behaviors into a plurality of queues according to the timestamp corresponding to each of the data transmission behaviors, and output one of a part of the data transmission behaviors of each of the queues in a first-in, first-out sequence to combine the one of the part of the data transmission behaviors of each of the queues into a data stream, and combine the data transmission behaviors of the queues into the data streams. The comparing step includes configuring the processing unit to compare the connecting port codes, the time values, the terminal nodes and the data transmission amounts of the data transmission behaviors corresponding to each of the data streams with the transmitting port, the transmitting time, the receiving port and a data amount of the data transmitted by the transmission instruction to determine whether each of the data streams is corresponding to one of the connecting port codes or not. The efficiency calculating step includes configuring the processing unit to store a part of the data streams, which is corresponding to the connecting port codes, to a register, and calculate the transmission efficiency of the transmission instruction according to the part of the data streams.

According to another aspect of the present disclosure, a data transmission efficiency analyzing system is configured to calculate a transmission efficiency of a transmission instruction. The transmission instruction is configured to control a transmitting port to transmit a data to a receiving port along a transmission route at a transmitting time. The transmission route has a plurality of connecting port codes. The data transmission efficiency analyzing system includes a memory unit and a processing unit. The memory unit is configured to store a plurality of data transmission behaviors between a plurality of nodes. The processing unit is connected to the memory unit, and configured to implement a data transmission efficiency analyzing method. The data transmission efficiency analyzing method includes performing a recording step, a data stream storing step, a comparing step and an efficiency calculating step. The recording step includes reading or writing the data transmission behaviors between the nodes, and generating a transmission recording table according to the data transmission behaviors. The transmission recording table includes each of the connecting port codes, a time value, a timestamp, a terminal node and a data transmission amount, which are corresponding to each of the data transmission behaviors. The data stream storing step includes storing the data transmission behaviors into a plurality of queues according to the timestamp corresponding to each of the data transmission behaviors, and outputting one of a part of the data transmission behaviors of each of the queues in a first-in, first-out sequence to combine the one of the part of the data transmission behaviors into a data stream, and combining the data transmission behaviors of the queues into the data streams. The comparing step includes comparing the connecting port codes, the time values, the terminal nodes and the data transmission amounts of the data transmission behaviors corresponding to each of the data streams with the transmitting port, the transmitting time, the receiving port and a data amount of the data transmitted by the transmission instruction to determine whether each of the data streams is corresponding to one of the connecting port codes or not. The efficiency calculating step include storing a part of the data streams, which is corresponding to the connecting port codes, to a register, and calculating the transmission efficiency of the transmission instruction according to the part of the data streams.

According to further another aspect of the present disclosure, a computer readable recording medium stores a program for a processing unit capable of calculating a transmission efficiency of a transmission instruction, to execute a data transmission efficiency analyzing method. The transmission instruction is configured to control a transmitting port to transmit a data to a receiving port along a transmission route at a transmitting time. The transmission route has a plurality of connecting port codes. The data transmission efficiency analyzing method includes performing a recording step, a data stream storing step, a comparing step, and an efficiency calculating step. The recording step includes configuring the processing unit to read or write a plurality of data transmission behaviors between a plurality of nodes from a memory unit, and generate a transmission recording table according to the data transmission behaviors. The transmission recording table includes each of the connecting port codes, a time value, a timestamp, a terminal node and a data transmission amount, which are corresponding to each of the data transmission behaviors. The data stream storing step includes configuring the processing unit to store the data transmission behaviors into a plurality of queues according to the timestamp corresponding to each of the data transmission behaviors, and output one of a part of the data transmission behaviors of each of the queues in a first-in, first-out sequence to combine the one of the part of the data transmission behaviors into a data stream, and combine the data transmission behaviors of the queues into the data streams. The comparing step includes configuring the processing unit to compare the connecting port codes, the time values, the terminal nodes and the data transmission amounts of the data transmission behaviors corresponding to each of the data streams with the transmitting port, the transmitting time, the receiving port and a data amount of the data transmitted by the transmission instruction to determine whether each of the data streams is corresponding to one of the connecting port codes or not. The efficiency calculating step includes configuring the processing unit to store a part of the data streams, which is corresponding to the connecting port codes, to a register, and calculate the transmission efficiency of the transmission instruction according to the part of the data streams.

BRIEF DESCRIPTION OF THE DRAWINGS

The present disclosure can be more fully understood by reading the following detailed description of the embodiment, with reference made to the accompanying drawings as follows:

FIG. 14 shows yet another schematic view of the analyzing result of the data transmission efficiency analyzing method of FIG. 10.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
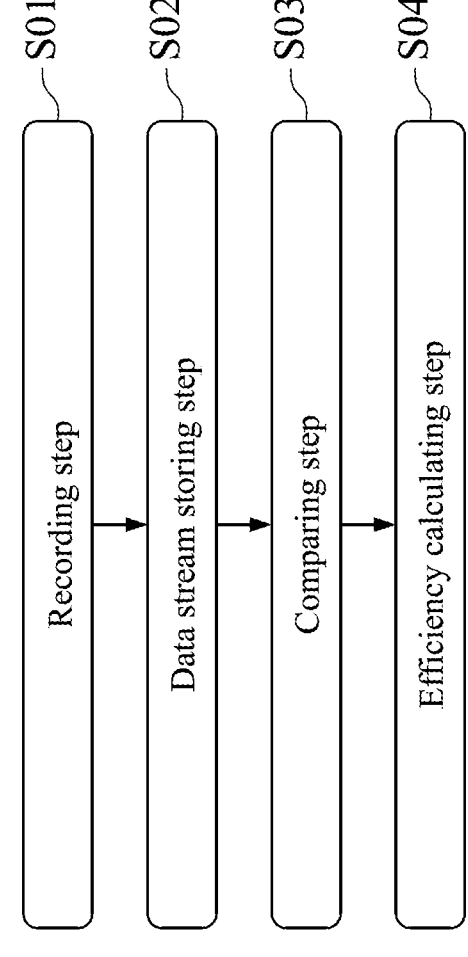
FIG. 1 shows a flow chart of a data transmission efficiency analyzing method according to a first embodiment of the present disclosure.
Figure 2:
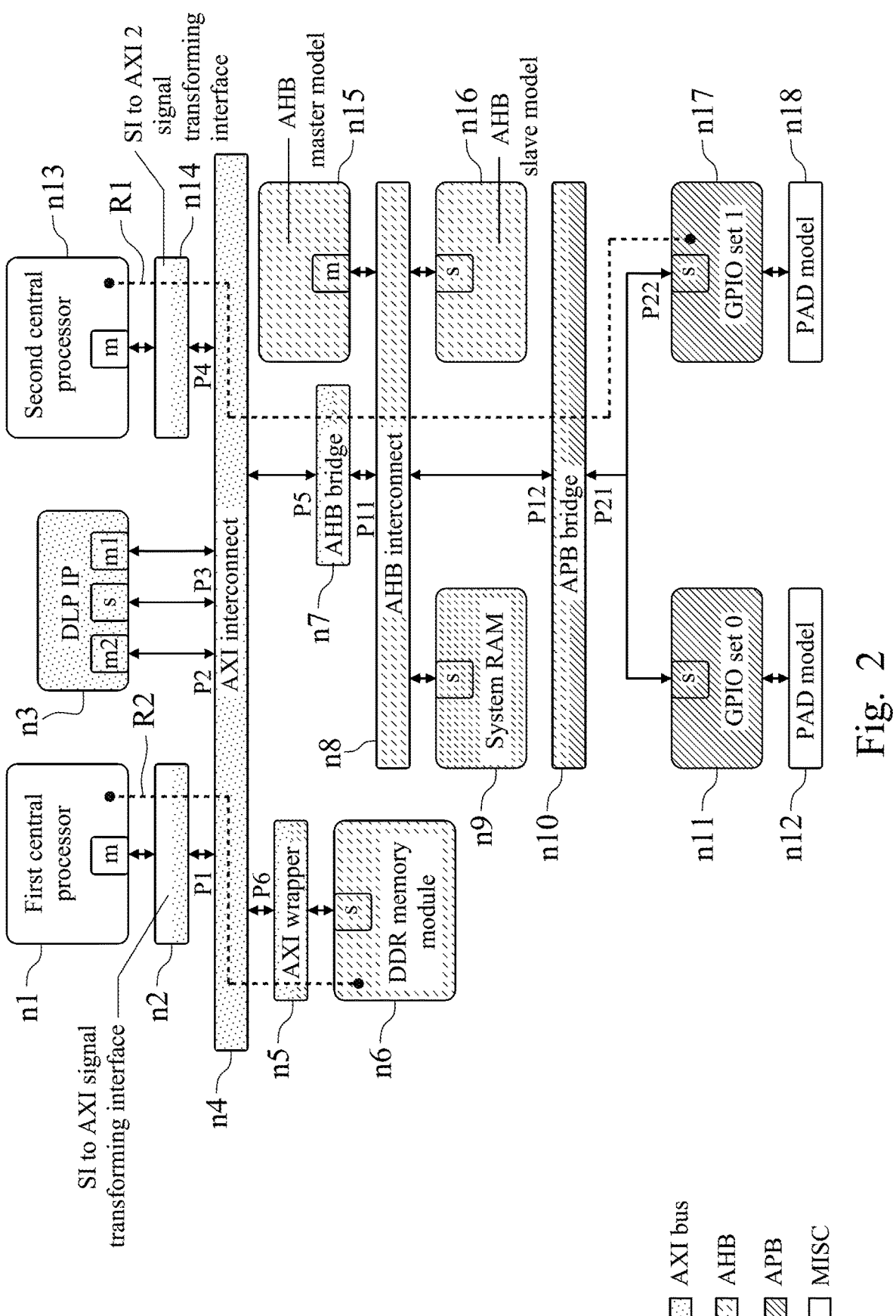
FIG. 2 shows a schematic view of the data transmission efficiency analyzing method in FIG. 1 applied to an Advanced Microcontroller Bus Architecture (AMBA).

Please refer to FIG. 1 and FIG. 2. FIG. 1 shows a flow chart of a data transmission efficiency analyzing method 100 according to a first embodiment of the present disclosure. FIG. 2 shows a schematic view of the data transmission efficiency analyzing method 100 in FIG. 1 applied to an AMBA. The AMBA includes two transmission routes R1, R2. The transmission route R1 includes a plurality of connecting port codes P4, P5, P11, P12, P21 and P22. The transmission route R2 includes connecting port codes P1, P6. The data transmission efficiency analyzing method 100 is configured to calculate a transmission efficiency of a transmission instruction. The transmission instruction is configured to control a transmitting port to transmit a data to a receiving port along a transmission route R1 at a transmitting time. The data transmission efficiency analyzing method 100 includes performing a recording step S01, a data stream storing step S02, a comparing step S03 and an efficiency calculating step S04. The recording step S01 includes configuring a processing unit to read or write a plurality of data transmission behaviors between a plurality of nodes n1, n2, n3, n4, n5, n6, n7, n8, n9, n10, n11, n12, n13, n14, n15, n16, n17, n18 from a memory unit, and generate a transmission recording table T1 (shown in FIG. 15) according to the data transmission behaviors. The transmission recording table T1 includes each of the connecting port codes P4, P5, P11, P12, P21, P22, a time value, a timestamp, a terminal node and a data transmission amount, which are corresponding to each of the data transmission behaviors. The data stream storing step S02 includes configuring the processing unit to store the data transmission behaviors into a plurality of queues Q1, Q2, Q3, Q4, Q5, Q6, Q7 according to the timestamp corresponding to each of the data transmission behaviors, and output one of a part of the data transmission behaviors of each of the queues Q1-Q7 in a first-in, first-out sequence to combine the one of the part of the data transmission behaviors of each of the queues Q1-Q7 into a data stream, and combine the data transmission behaviors of the queues Q1-Q7 into the data streams. The comparing step S03 includes configuring the processing unit to compare the connecting port codes P4, P5, P11, P12, P21, P22, the time values, the terminal nodes and the data transmission amounts of the data transmission behaviors corresponding to each of the data streams with the transmitting port, the transmitting time, the receiving port and a data amount of the data transmitted by the transmission instruction to determine whether each of the data streams is corresponding to one of the connecting port codes P4, P5, P11, P12, P21 and P22 or not. The efficiency calculating step S04 includes configuring the processing unit to store a part of the data streams, which is corresponding to the connecting port codes P4, P5, P11, P12, P21 and P22, to a register, and calculate the transmission efficiency of the transmission instruction according to the part of the data streams. Thus, the data transmission efficiency analyzing method 100 of the present disclosure can compare the connecting port codes P4, P5, P11, P12, P21, P22, the terminal node, the data transmission amount with the transmission instruction to calculate the transmission efficiency of a data transmission, which is transmitted across the buses.

In the first embodiment, the data transmission efficiency analyzing method 100 is applied to the AMBA of the Advanced RISC Machine (ARM), the nodes n1-n18 are configured to represent an Advanced extensible Interface (AXI) bus, an AMBA High-performance Bus (AHB), an Advanced Peripheral Bus (APB) and a Minimal Instruction Set Computer (MISC) and interconnects of the aforementioned buses, but the present disclosure is not limited thereto. The node n1 corresponds to a first central processor, the node n2 corresponds to a SI to AXI signal transforming interface, the node n3 corresponds to a Deep Learning Processor (DLP) IP, the node n4 corresponds to an AXI interconnect, the node n5 corresponds to an AXI wrapper, the node n6 corresponds to a Double Data Rate (DDR) memory module, the node n7 corresponds to an AHB bridge, the node n8 corresponds to an AHB interconnect, the node n9 corresponds to a system Random-Access Memory (RAM), the node n10 corresponds to an APB bridge, the node n11 corresponds to a General Purpose Input/Output (GPIO) set 0, the node 12 corresponds to a Pin and Device (PAD) model, the node n13 corresponds to a second central processor, the node n14 corresponds to a SI to AXI 2 signal transforming interface, the node n15 corresponds to an AHB master model, the node n16 corresponds to an AHB slave model, the node n17 corresponds to a GPIO set 1, the node n18 corresponds to another PAD model. The DLP IP and the AXI interconnect are connected via the connecting port codes P2 and P3. In FIG. 2, a data transmitted from the node n13 to the node n18 passes through the connecting port codes P4, P5, P11, P12, P21 and P22. For example, a transmission instruction is transmitted from the processing unit to control the node n13 to transmit a data to the node n18, the node n13 is the transmitting port in the transmission instruction, and the node n18 is the receiving port in the transmission instruction. In the data transmission process, the data cannot be transmitted to the node n18 from the node n13 directly, the data need to pass through other nodes n14, n,4, n7, n8, n10 and n17, to transmit the data via the connecting port codes P4, P5, P11, P12, P21 and P22 to the node n18.

In detail, a signal of each of the nodes n1-n18 is changed during each of the data transmission behaviors occurred. Thus, the recording step S01 is performed to read or write all the signal transforming time point of the nodes n1-n18 in the AMBA, and assign the timestamp and other relative information according to the signal transforming time point to generate the transmission recording table T1. The transmission recording table T1 can be listed in Table 1. The transmission recording table T1 can be a data statistics profile developed by the Verilog language, but the present disclosure is not limited thereto.

TABLE 1

| Data transmission behaviors | Connecting port code | Time-stamp | Time value (ns) | Address of terminal node |
|---|---|---|---|---|
| DT1 | P4 | 1 | 100 | 2689597440 |
| DT2 | P5 | 1 | 120 | 2689597440 |
| DT3 | P4 | 2 | 240 | 2689597440 |
| DT4 | P5 | 2 | 260 | 2689597440 |
| DT5 | P4 | 3 | 340 | 2689597440 |
| DT6 | P5 | 3 | 360 | 2689597440 |
| DT7 | P4 | 4 | 400 | 2689597440 |
| DT8 | P5 | 4 | 420 | 2689597440 |
| DT9 | P4 | 5 | 480 | 2689597440 |
| DT10 | P5 | 5 | 500 | 2689597440 |
| DT11 | P11 | 1 | 520 | 0 |
| DT12 | P12 | 1 | 520 | 0 |
| DT13 | P11 | 2 | 560 | 0 |
| . . . | . . . | . . . | . . . | . . . |
| DTN-3 | P4 | 6 | 660 | 2689597440 |
| DTN-2 | P5 | 6 | 680 | 2689597440 |
| DTN-1 | P4 | 7 | 800 | 2689597440 |
| DTN | P5 | 7 | 820 | 2689597440 |

Please refer to Table 1, Table 1 lists the data transmission behaviors DT1, DT2, DT3, DT4, DT5, DT6, DT7, DT8, DT9, DT10, DT11, DT12, DT13-DTN-3, DTN-2, DTN-1 and DTN begin from the time value 0. Take the data transmission behavior DT1 as example, a first signal variation of the connecting port code P4 occurred when the time value is 100 ns, therefore, the timestamp of the data transmission behavior DT1 is 1, and the address of the terminal node is "2689597440". As shown in the data transmission behaviors DT2-DTN in Table 1, the time values of the signal variations of the connecting port code P5 are all near to the connecting port code P4, and the timestamp of the connecting port code P5 are the same as the connecting port code P4. Therefore, the terminal node of the data transmission behavior DT1 is corresponding to the connecting port code P5, and "2689597440" is an address corresponded to the connecting port code P5.

In the first embodiment, when the data transmission behaviors DT1-DTN are reading data or writing data, the represented operation corresponded to the timestamps are listed in Table 2. Take the data transmission behavior DT1 as example, the transmission initiating terminal is the connecting port code P4, and the transmission receiving terminal is the terminal node (the connecting port code P5). In other words, when the data transmission behavior DT1 operated by the connecting port code P4 is writing data, and the timestamp of the data transmission behavior DT1 is 1, the data transmission behavior DT1 is "The transmission initiating terminal initiates an address reading communicating request". Further, the connecting port code P4 needs to complete all the operation corresponded to the timestamps 1-7 of the writing data in the Table 2 to write a data into the connecting port code P5. Also, the connecting port code P4 needs to complete all the operation corresponded to the timestamps 1-5 of the reading data in the Table 2 to read a data from the connecting port code P5. The detail of the data stream storing step S02 is described in more detail below.

TABLE 2

| Time-stamp | Reading data | Writing data |
|---|---|---|
| 1 | The transmission initiating terminal initiates an address reading communicating request. | The transmission initiating terminal initiates an address writing communicating request. |
| 2 | The transmission receiving terminal replies an address reading communication channel establishment. | The transmission receiving terminal replies an address writing communication channel establishment. |
| 3 | The transmission initiating terminal initiates a data reading communicating request. | The transmission initiating terminal initiates a data writing communicating request. |
| 4 | The transmission receiving terminal replies a data reading communication channel establishment. | The transmission receiving terminal replies a data writing communication channel establishment |
| 5 | The transmission receiving terminal replies the data reading is completed. | The transmission receiving terminal replies the data writing is completed. |
| 6 | N/A | The transmission receiving terminal requests to establish a reply channel. |
| 7 | N/A | The transmission initiating terminal replies an establishment completed request. |

Figure 3:
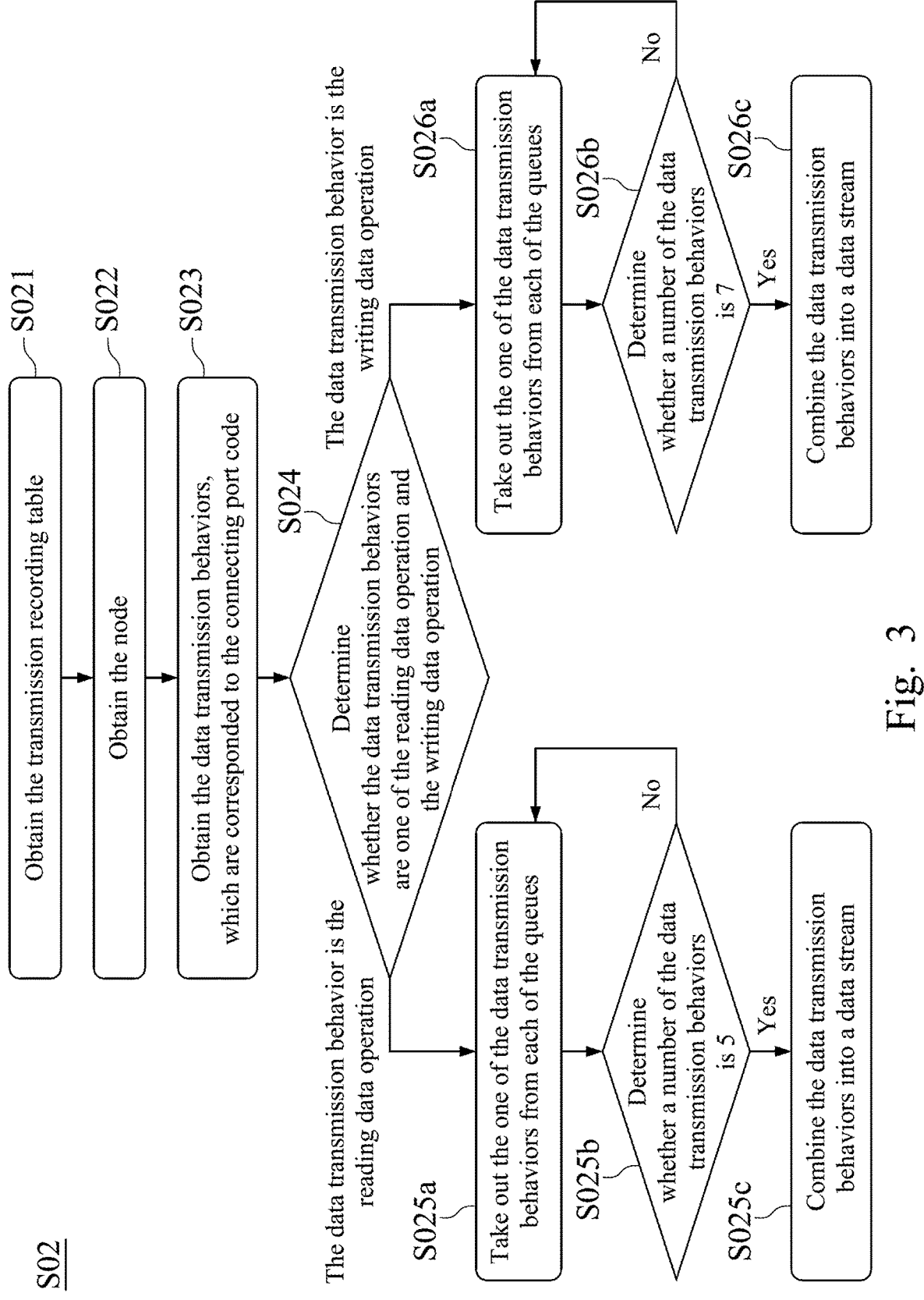
FIG. 3 shows a flow chart of the data stream storing step of the data transmission efficiency analyzing method of FIG. 1.
Figure 4:
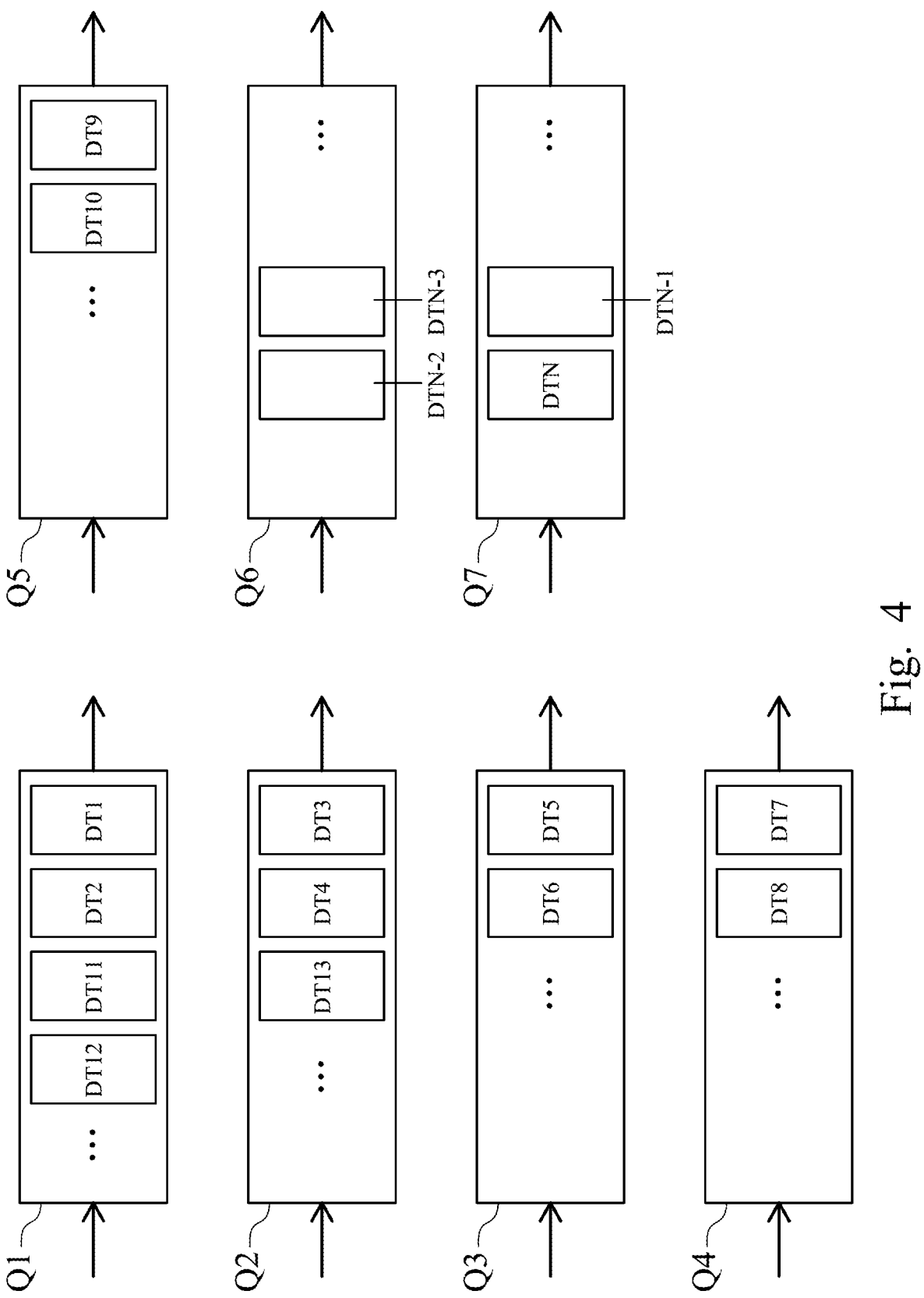
FIG. 4 shows a schematic view of the queues of the data stream storing step of the data transmission efficiency analyzing method of FIG. 1.

Please refer to FIG. 1 to FIG. 4. FIG. 3 shows a flow chart of the data stream storing step S02 of the data transmission efficiency analyzing method 100 of FIG. 1. FIG. 4 shows a schematic view of the queues Q1-Q7 of the data stream storing step S02 of the data transmission efficiency analyzing method 100 of FIG. 1. The data stream storing step S02 can include steps S021, S022, S023, S024, S025a, S025b, S025c, S026a, S026b, S026c. For instance, the step S021 is performed to obtain the transmission recording table T1 of the data transmission behaviors DT1-DTN corresponding to the nodes n1-n18. The steps S022, S023 are performed to obtain the node n14 and the data transmission behaviors DT1, DT3, DT5, DT7, DT9, DTN-3 and DTN-1, which are corresponded to the connecting port code P4. The step S024 is performed to determine whether the present data transmission behaviors DT1, DT3, DT5, DT7, DT9, DTN-3 and DTN-1 are one of the reading data operation and the writing data operation according to the timestamp of the data transmission behaviors DT1, DT3, DT5, DT7, DT9, DTN-3 and DTN-1. In response to determine that the data transmission behaviors DT1, DT3, DT5, DT7, DT9, DTN-3 and DTN-1 are the reading data operation, the step S025a is performed. In response to determine that the data transmission behaviors DT1, DT3, DT5, DT7, DT9, DTN-3 and DTN-1 are the writing data operation, the step S026a is performed. Because a maximum value of the timestamp corresponding to the data transmission behaviors DT1, DT3, DT5, DT7, DT9, DTN-3 and DTN-1, which is corresponded to the connecting port code P4, is 7, the data transmission behaviors DT1, DT3, DT5, DT7, DT9, DTN-3 and DTN-1 corresponded to the connecting port code P4 is the writing data operation. The step S026a is performed to take out the data transmission behaviors DT1, DT3, DT5, DT7, DT9, DTN-3 and DTN-1 from the queues Q1-Q7, respectively, in the first-in, first-out sequence. The step S026b is performed to determine whether a number of the data transmission behaviors DT1, DT3, DT5, DT7, DT9, DTN-3, DTN-1 taken out from the queues Q1-Q7 is 7, that is, determine whether all the data transmission behaviors DT1, DT3, DT5, DT7, DT9, DTN-3, DTN-1 corresponded to the connecting port code P4 are taken out. The step S026c is performed to combine the data transmission behaviors DT1, DT3, DT5, DT7, DT9, DTN-3 and DTN-1 taken out from the queues Q1-Q7 into a data stream. Moreover, in response to determine that the data transmission behaviors DT1, DT3, DT5, DT7 and DT9 are the reading data operation, the step S025a is performed to take out the data transmission behaviors DT1, DT3, DT5, DT7 and DT9 from the queues Q1-Q5, respectively, in the first-in, first-out sequence. The step S025b is performed to determine whether a number of the data transmission behaviors DT1, DT3, DT5, DT7 and DT9 taken out from the queues Q1-Q5 is 5, that is, determine whether all the data transmission behaviors DT1, DT3, DT5, DT7 and DT9 corresponded to the connecting port code P4 are taken out. The step S025c is performed to combine the data transmission behaviors DT1, DT3, DT5, DT7 and DT9 taken out from the queues Q1-Q5 into a data stream.

In other words, the data stream storing step S02 is performed to take out the data transmission behaviors DT1, DT3, DT5, DT7, DT9, DTN-3 and DTN-1, which are corresponded to the connecting port code P4, from the queues Q1-Q7, and combine the data transmission behaviors DT1, DT3, DT5, DT7, DT9, DTN-3 and DTN-1 into a data stream, and take out the data transmission behaviors DT2, DT4, DT6, DT8, DT10, DTN-2 and DTN, which are corresponded to the connecting port code P5, from the queues Q1-Q7, and combine the data transmission behaviors DT2, DT4, DT6, DT8, DT10, DTN-2 and DTN into another data stream. The detail of each of the steps is described in more detail below.

Figure 5:
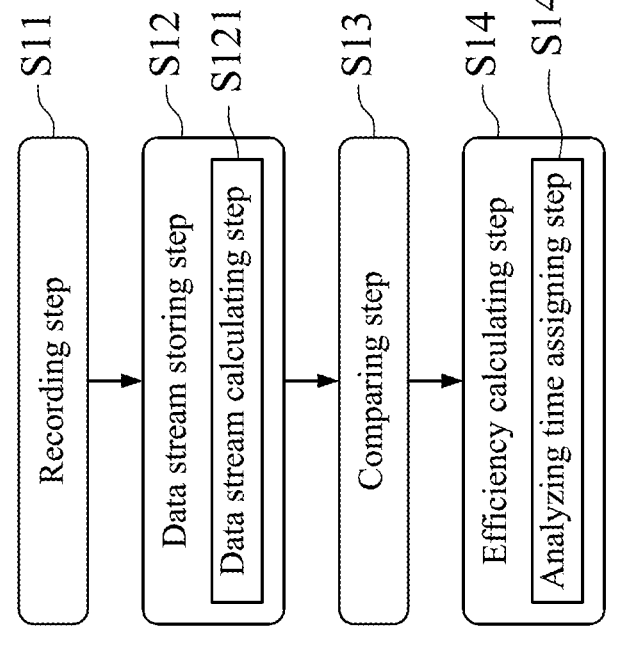
FIG. 5 shows a flow chart of a data transmission efficiency analyzing method according to a second embodiment of the present disclosure.

Please refer to FIG. 1 to FIG. 5. FIG. 5 shows a flow chart of a data transmission efficiency analyzing method 100a according to a second embodiment of the present disclosure. The data transmission efficiency analyzing method 100a includes performing a recording step S11, a data stream storing step S12, a comparing step S13 and an efficiency calculating step S14. In the second embodiment, the recording step S11 is the same as the recording step S01 in the data transmission efficiency analyzing method 100 of the first embodiment, and will not be described again.

Besides the operation described in the data stream storing step S02 of the data transmission efficiency analyzing method 100 of the first embodiment, the data stream storing step S12 further includes a data stream calculating step S121. The data stream calculating step S121 includes configuring the processing unit to calculate a transmitting starting time and a transmitting ending time of each of the data streams according to the connecting port codes P4, P5, P11, P12, P21, P22, the time values, the terminal nodes and the data transmission amount of the data transmission behaviors DT1, DT3, DT5, DT7, DT9, DTN-3 and DTN-1 corresponding to each of the data streams. Take the data transmission behaviors DT1, DT3, DT5, DT7, DT9, DTN-3 and DTN-1 as example, the transmitting starting time is the time value 100 ns corresponded to the timestamp 1 of the data transmission behaviors DT1, the transmitting ending time is the time value 800 ns corresponded to the timestamp 7 of the data transmission behaviors DTN-1.

Figure 6:
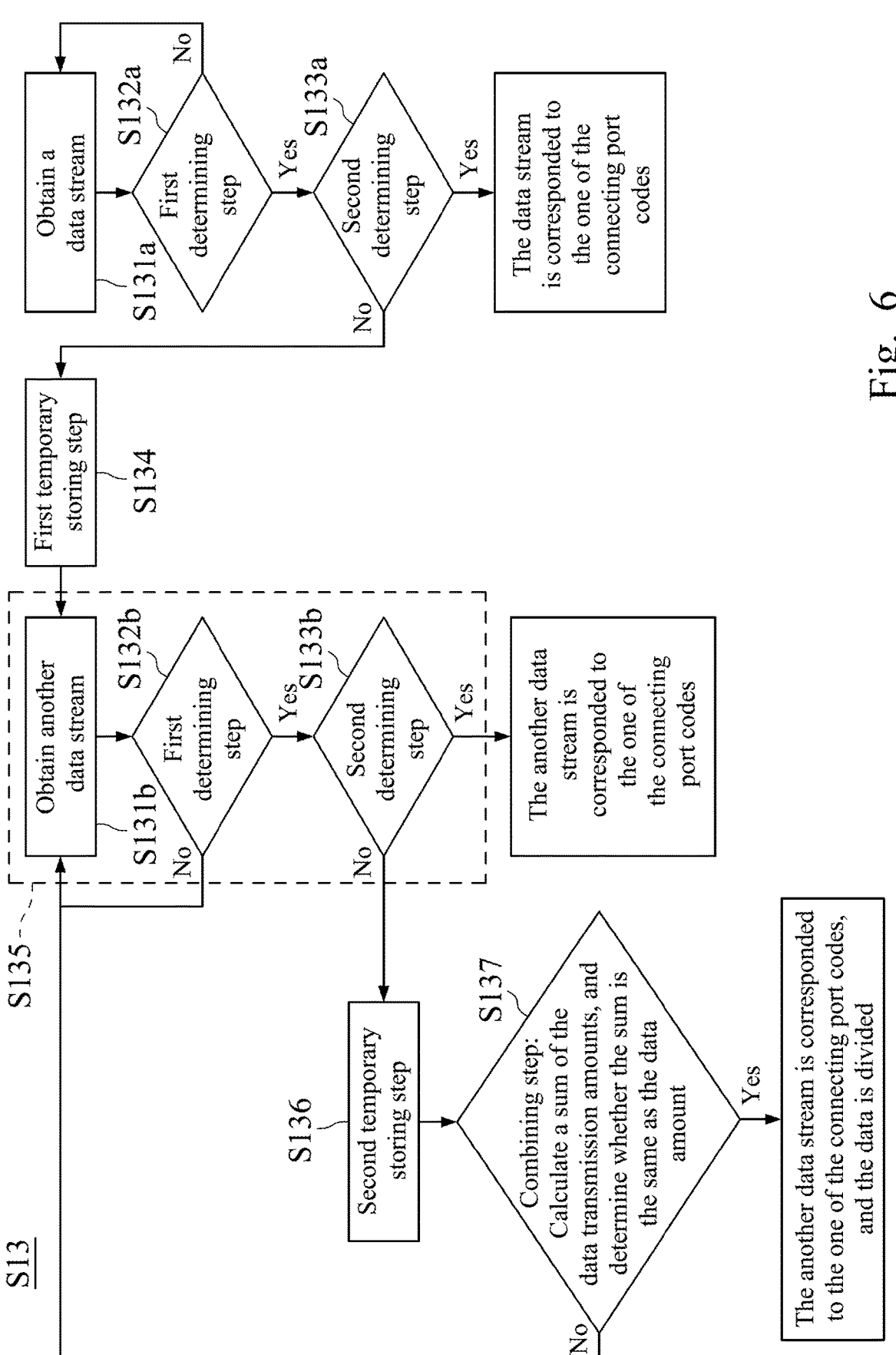
FIG. 6 shows a flow chart of the comparing step of the data transmission efficiency analyzing method of FIG. 5.

Please refer to FIG. 2, FIG. 5 and FIG. 6. FIG. 6 shows a flow chart of the comparing step S13 of the data transmission efficiency analyzing method 100a of FIG. 5. The comparing step S13 can further include a first determining step S132a and a second determining step S133a. The first determining step S132a includes configuring the processing unit to determine whether at least one of the connecting port codes P4, P5, P11, P12, P21, P22 and the terminal nodes of the data transmission behaviors DT1, DT3, DT5, DT7, DT9, DTN-3, DTN-1 corresponding to one of the data streams is the same as at least one of the transmitting port and the receiving port of the transmission instruction, and determine whether a transmitting starting time of one of the data streams is later than or the same as the transmitting time of the transmission instruction to generate a first determining result. The second determining step S133a includes configuring the processing unit to determine whether the data transmission amount of one of the data streams is equal to the data amount of the data transmitted by the transmission instruction to generate a second determining result. In response to determine that the first determining result is true and the second determining result is true, one of the data streams is one of the connecting port codes P4, P5, P11, P12, P21 and P22.

In response to determine that the first determining result is true and the second determining result is false, the comparing step S13 can further include a first temporary storing step S134, a repeat performing step S135, a second temporary storing step S136 and a combining step S137. The first temporary storing step S134 includes configuring the processing unit to store one of the data streams into another register. The repeat performing step S135 includes configuring the processing unit to perform the first determining step S132b and the second determining step S133b to another one of the data streams. The second temporary storing step S136 includes configuring the processing unit to store another one of the data streams into another register, when the first determining result corresponding to another one of the data streams is true and the second determining result corresponding to the another one of the data streams is false. The combining step S137 includes configuring the processing unit to calculate a sum of the data transmission amounts in another register, and determine whether the sum is the same as the data amount of the data. In response to determine that the first determining result is true and the second determining result is true, one of the data streams and another one of the data streams are both the one of the connecting port codes P4, P5, P11, P12, P21 and P22.

In detail, the comparing step S13 can further include the steps S131a and S131b. The step S131a is performed to obtain a data stream. The first determining step S132a is performed to determine at least one of the connecting port codes P4, which is corresponded to the data transmission behaviors DT1, DT3, DT5, DT7, DT9, DTN-3, DTN-1 of the data stream and the terminal node (the connecting port code P5) is the same as the transmitting port (the connecting port code P4) and the receiving port (the connecting port code P12), and whether the transmitting starting time (100 ns) of the data stream is later than the transmitting time of the transmission instruction. If any of the nodes n1-n18 and the terminal node corresponded to the present data stream is different from the transmitting port and the receiving port of the transmission instruction, the present data stream may not be one of the connecting port codes P4, P5, P11, P12, P21, P22 of the transmission route R1 of the transmission instruction. If any of the nodes n1-n18 and the terminal node corresponded to the present data stream is the same as the transmitting port and the receiving port of the transmission instruction and the transmitting starting time of the present data stream is earlier than the transmitting time of the transmission instruction, the present data stream occurred before the transmission instruction. Thus, the present data stream may not be one of the connecting port codes P4, P5, P11, P12, P21 and P22 of the transmission route R1 of the transmission instruction.

In response to determine that the first determining result of the first determining step S132a is false, the step S131a is performed again to obtain another data stream. In response to determine that the first determining result is true, the second determining step S133a is performed. When the data amount of the data transmitted by the transmission instruction is 8 bytes, and the data transmission amount of the present data stream is also 8 bytes, the second determining result is true, and the present data stream is determined as one of the connecting port codes P4, P5, P11, P12, P21 and P22. If the data amount of the data transmitted by the transmission instruction is 8 bytes, and the data transmission amount of the present data stream is 4 bytes, the second determining result is false, and the first temporary storing step S134 is performed. The first temporary storing step S134 is performed to store the present data stream in the aforementioned register, and the repeat performing step S135 is performed. The repeat performing step S135 includes performing the step S131b, the first determining step S132b and the second determining step S133b. The step S131b is performed to obtain another data stream, and perform the first determining step S132b on another data stream. In response to determine that the first determining result of the first determining step S132b is false, the step S131b is performed to obtain other data stream. In response to determine that the first determining result is true, the second determining step S133b is performed. If the data amount of the data transmitted by the transmission instruction is 8 bytes, and the data transmission amount of another data stream is also 8 bytes, the second determining result is true, and another data stream is determined as one of the connecting port codes P4, P5, P11, P12, P21 and P22. If the data amount of the data transmitted by the transmission instruction is 8 bytes, and the data transmission amount of another data stream is 4 bytes, the second determining result is false, and the second temporary step S136 is performed to store another data stream into the aforementioned register. The combining step S137 is performed to calculate a sum of the data transmission amounts of the data streams in the register, and determine whether the sum is the same as the data amount of the data. If the data transmission amount of the present data stream and the data transmission amount of another data stream are both 4 bytes, the sum of the data transmission amounts of the present data stream and another data stream is the same as the data amount of the data, and a storing address of the present data stream and a storing address of the another data stream are continuous at the same node, that is, a transmission instruction with a 8 byte data is divided into two pieces of 4 byte data to transmit. Thus, the present data stream and another data stream are both correspond to one of the connecting port codes P4, P5, P11, P12, P21 and P22. In detail, if a data of the present data stream is stored in addresses 100-103 of the connecting port code P5, and a data of another data stream is stored in addresses 104-107 of the connecting port code P5, the storing addresses of the present data stream and another data stream at the connecting port code P5 are continuous.

In other embodiments, in response to determine that the first determining result is true and the second determining result is false, and a data transmission amount of the data stream is larger than the data amount of the data transmitted by the transmission instruction, it may be a condition that two transmission instructions with same transmitting port and same receiving port are combined to transmit. The data transmission efficiency analyzing method of the present disclosure can also find out the transmission route of the above condition.

Figure 7:
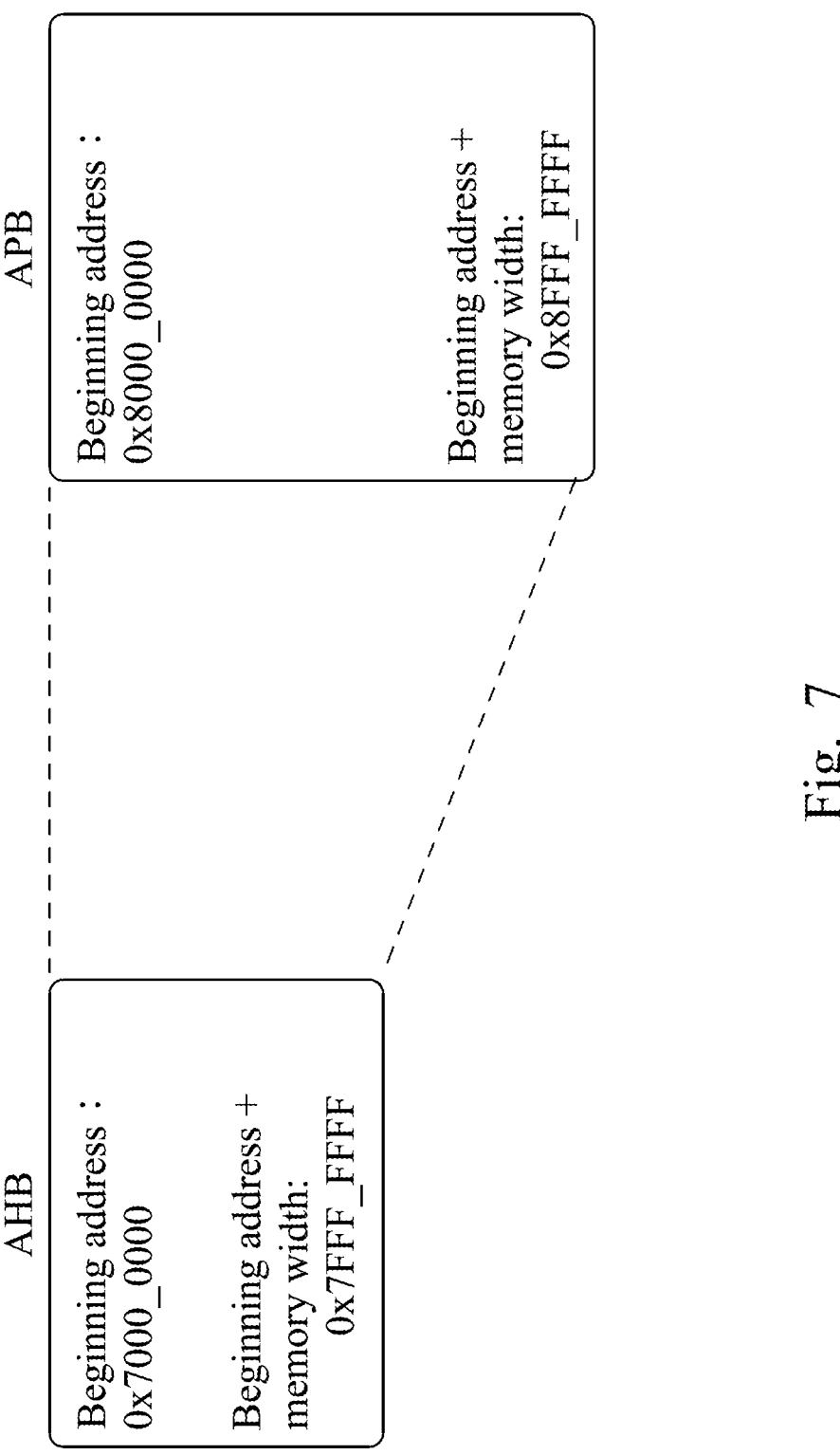
FIG. 7 shows a schematic view of an address transforming algorithm of the second determining step of the data transmission efficiency analyzing method of FIG. 5.

Please refer to FIG. 2, FIG. 5 and FIG. 7. FIG. 7 shows a schematic view of an address transforming algorithm of the second determining step S133a, S133b of the data transmission efficiency analyzing method 100a of FIG. 5. The transmission recording table T1 can further include a plurality of data addresses. Each of the second determining steps S133a, S133b can further include configuring the processing unit to transform each of the data addresses of each of the nodes n1-n18 to a transformed address according to an address transforming algorithm, and determine whether the transformed address is in a predetermined range. The predetermined range is described as follows: F2_addr≤t_addr≤F2_addr+F2_size−1. F2_addr is represented as a begin address of the receiving port, t_addr is represented as the transformed address, F2_size is represented as a memory width of the receiving port.

In detail, the transmission recording table T1 further includes a data address of the data of each of the data transmission behaviors DT1-DTN, while the data is stored in a beginning node, and the data addresses stored in different buses are different. For example, a beginning address of the AHB is 0x7000_0000, and the memory width of the AHB is 0x1000_0000. When a data is stored in the AHB, the data address of the data may be between 0x7000_0000 to 0x7FFF_FFFF. A beginning address of the APB is 0x8000_0000, and the memory width of the APB is 0x1000_0000. When a data is stored in the APB, the data address of the data may be between 0x8000_0000 to 0x8FFF_FFFF. When a data is stored in AHB, and the data address is 0x7000_0001, and the data is transmitted to the APB, the data address of the aforementioned data stored in the APB will be changed to 0x8000_0001. The address transforming algorithm can transform the data address of the data stored in the AHB into the data address of the data stored in the APB. When multiple transmission instructions are transmitting across the buses in the AMBA at the same time, the connecting port codes P4, P5, P11, P12, P21, P22 and the data amount may be the same, and the comparing step S03 may misjudge. The address transforming algorithm can calculate the transformed address, which is a data address after the data is transmitted to the receiving port according to the data address in the transmission recording table T1, and verify whether the transformed address is in a storing space of the receiving port. If a transformed address calculated by the address transforming algorithm is out of the predetermined range of the storing space of the receiving port, that is, the data is not one of the connecting port codes P4, P5, P11, P12, P21 and P22 corresponded to the aforementioned transmission instruction. Thus, the data transmission efficiency analyzing method 100a of the present disclosure can calculate the transmission efficiency in the AMBA, which has multiple data transmissions crossing different buses accurately.

When the data stream corresponding to all the connecting port codes P4, P5, P11, P12, P21 and P22 of the transmission route R1 are found, the efficiency calculating step S14 is performed to calculate the transmission efficiency according to the earliest one of the transmitting starting times and the latest one of the transmitting ending time of the connecting port codes P4, P5, P11, P12, P21 and P22 corresponding to the data stream.

Figure 8:
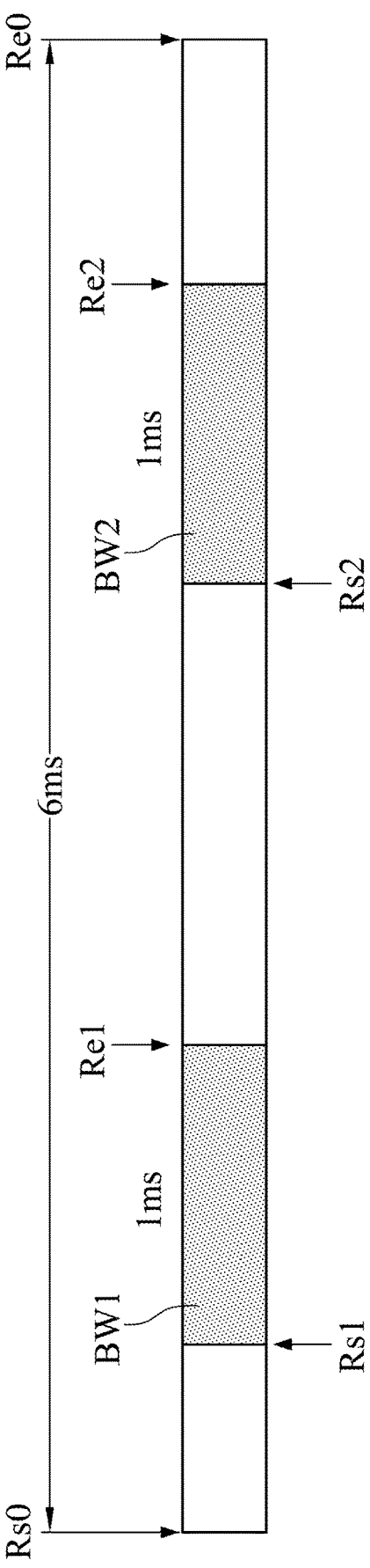
FIG. 8 shows a schematic view of an analyzing time assigning step of the data transmission efficiency analyzing method of FIG. 5.

Please refer to FIG. 5 and FIG. 8. FIG. 8 shows a schematic view of an analyzing time assigning step S141 of the data transmission efficiency analyzing method 100a of FIG. 5. The efficiency calculating step S14 can further include performing an analyzing time assigning step S141. The analyzing time assigning step S141 includes configuring the processing unit to mark assigning start time labels Rs1, Rs2 and assigning end time labels Re1, Re2 between the time values corresponding to each of the data streams, and calculate a time difference corresponding to the assigning start time labels Rs1, Rs2 and the assigning end time labels Re1, Re2 to calculate the transmission efficiency of the transmission instruction. In detail, if a time difference between a beginning time and an ending time of a data transmission is 6 ms, the data transmission may only operate in the target sections BW1, BW2, and the data transmission does not happen in the other time. The analyzing time assigning step S141 is performed to put the assigning start time labels Rs1, Rs2 and the assigning end time labels Re1, Re2 at the target sections BW1, BW2, to calculate the actual efficiency of the target sections BW1, BW2, which the data transmission is operated in. Thus, the data transmission efficiency analyzing method 100a of the present disclosure can analyze the efficiency of the target sections BW1, BW2 via the analyzing time assigning step S141, and exclude the section, which don't need to be analyzed, to find out the problem section.

Figure 9:
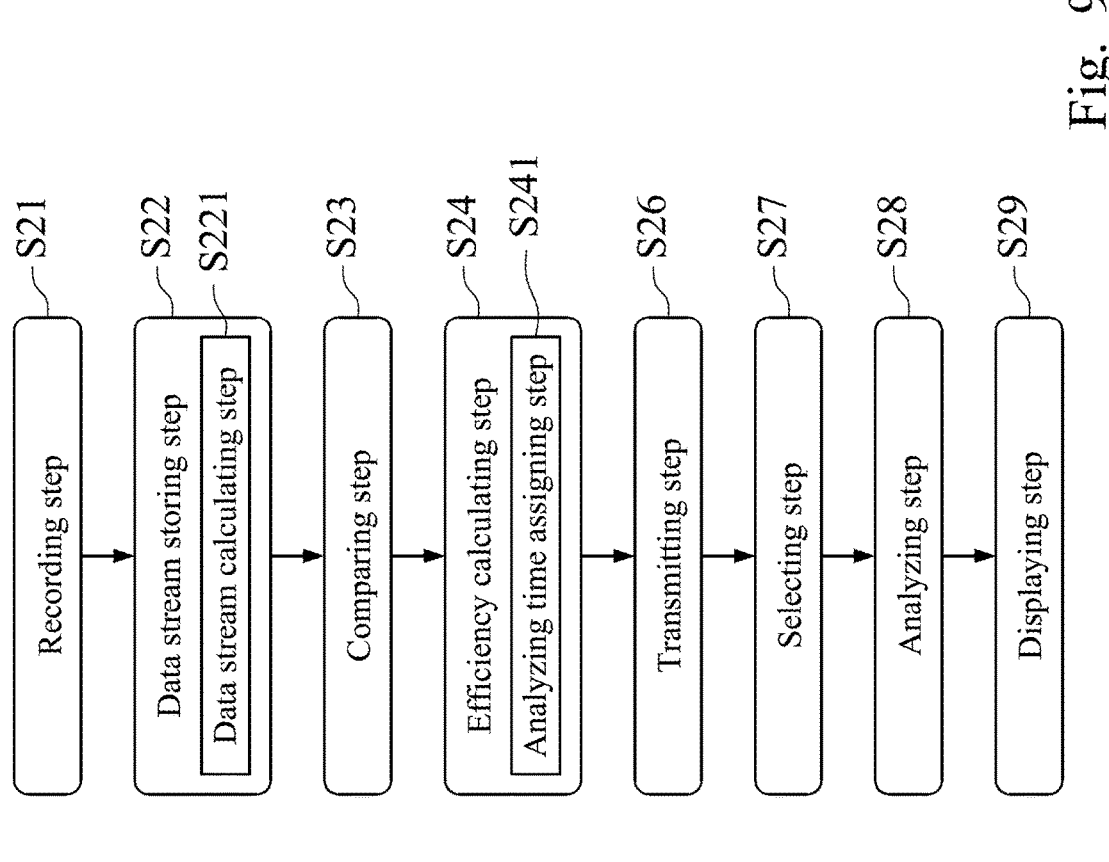
FIG. 9 shows a flow chart of a data transmission efficiency analyzing method according to a third embodiment of the present disclosure.
Figure 10:
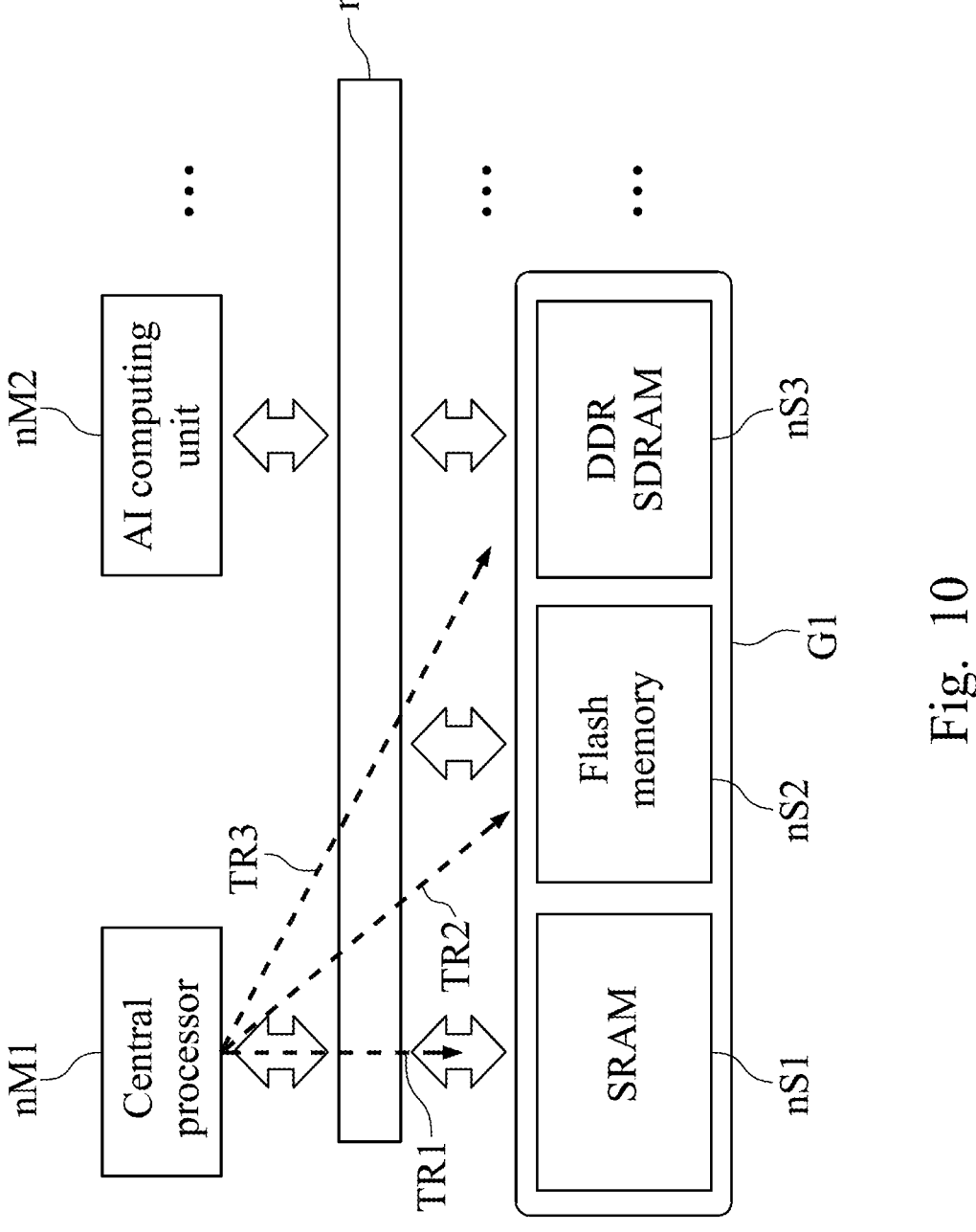
FIG. 10 shows a schematic view of the data transmission efficiency analyzing method of FIG. 9 applied to a bus structure.
Figure 11:
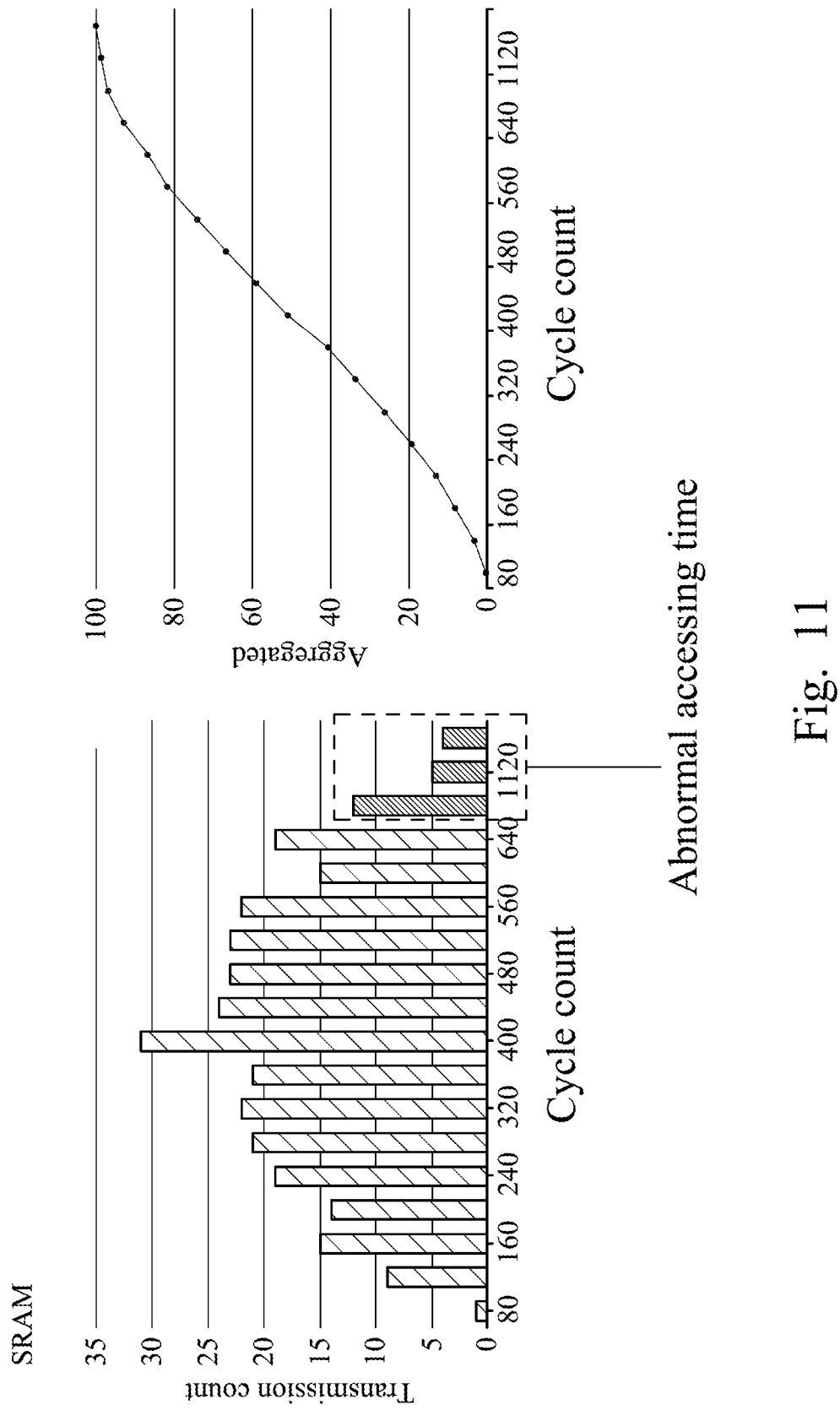
FIG. 11 shows a schematic view of an analyzing result of the data transmission efficiency analyzing method of FIG. 10.
Figure 12:
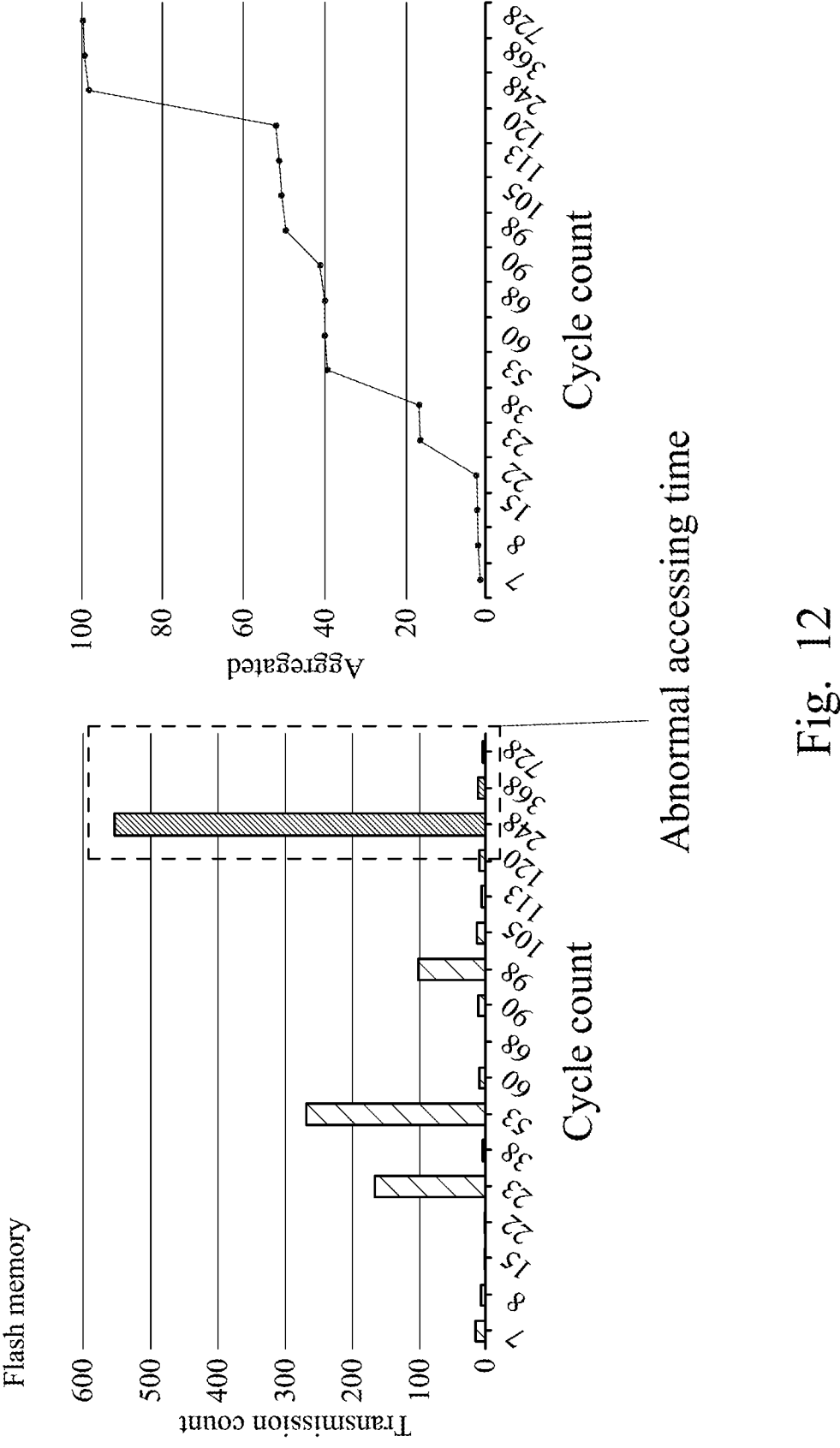
FIG. 12 shows another schematic view of the analyzing result of the data transmission efficiency analyzing method of FIG. 10.
Figure 13:
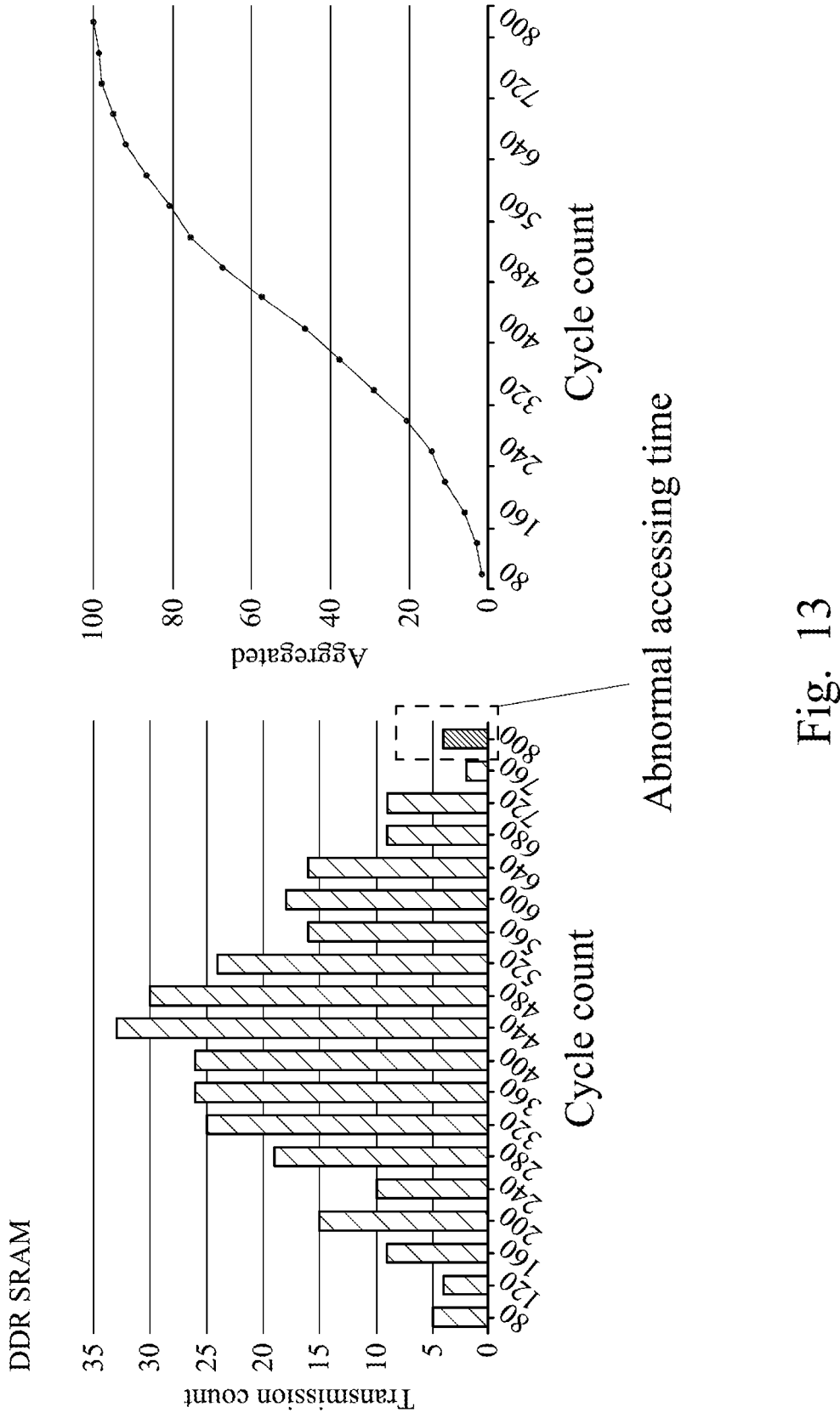
FIG. 13 shows further another schematic view of the analyzing result of the data transmission efficiency analyzing method of FIG. 10.

Please refer to FIG. 5, FIG. 9 to FIG. 14. FIG. 9 shows a flow chart of a data transmission efficiency analyzing method 100b according to a third embodiment of the present disclosure. FIG. 10 shows a schematic view of the data transmission efficiency analyzing method 100b of FIG. 9 applied to a bus structure. FIG. 11 shows a schematic view of an analyzing result of the data transmission efficiency analyzing method 100b of FIG. 10. FIG. 12 shows another schematic view of the analyzing result of the data transmission efficiency analyzing method 100b of FIG. 10. FIG. 13 shows further another schematic view of the analyzing result of the data transmission efficiency analyzing method 100b of FIG. 10. FIG. 14 shows yet another schematic view of the analyzing result of the data transmission efficiency analyzing method 100b of FIG. 10. The data transmission efficiency analyzing method 100b can be applied to the bus structure in FIG. 10. The bus structure includes a plurality of nodes nM1, nM2, nS1, nS2, nS3 and n. The nodes nM1, nM2, nS1, nS2, nS3 and n include at least one master device and a plurality of slave devices. The master device includes a central processor, which is corresponded to the node nM1 and an artificial intelligent (AI) computing unit, which is corresponded to the node nM2. The AI computing unit can be a computing device with AI program. The slave devices include a Static Random-Access Memory (SRAM), which is corresponded to the node nS1, a flash memory, which is corresponded to the node nS2 and a Double Data Rate Synchronous Dynamic Random-Access Memory (DDR SDRAM), which is corresponded to the node nS3. The data transmission efficiency analyzing method 100b includes a recording step S21, a data stream storing step S22, a comparing step S23, an efficiency calculating step S24, a transmitting step S26, a selecting step S27, an analyzing step S28 and a displaying step S29. The data stream storing step S22 includes a data stream calculating step S221. The efficiency calculating step S24 includes an analyzing time assigning step S241. In the third embodiment, the recording step S21, the data stream storing step S22, the comparing step S23, the efficiency calculating step S24, the data stream calculating step S221 and the analyzing time assigning step S241 can be the same as the recording step S11, the data stream storing step S12, the comparing step S13, the efficiency calculating step S14, the data stream calculating step S121 and the analyzing time assigning step S141 of the data transmission efficiency analyzing method 100. Moreover, the transmitting step S26 includes configuring at least one master device (such as the node nM1) of the nodes nM1, nM2, nS1, nS2, nS3, n to transmit the transmission instructions TR1, TR2, TR3 to a plurality of slave devices (such as the nodes nS1, nS2, nS3). The selecting step S27 includes configuring the processing unit to select at least one of the slave devices (the nodes nS1, nS2, nS3). The analyzing step S28 includes configuring the processing unit to analyze at least one of the transmission instructions TR1, TR2, TR3 between the at least one master device (the node nM1) and the at least one of the slave devices (the node nS1, nS2, nS30) to generate an analyzing result. The displaying step S29 includes configuring the processing unit to display the analyzing result on a window. Further, the selecting step S27 can select the slave devices (the nodes nS1, nS2, nS3) as a group G1, and display the analyzing result of the transmission instructions TR1, TR2, TR3 between the master device (the node nM1) and the slave devices (the nodes nS1, nS2, nS3) on the window, so that the user can view the analyzing result of the transmission instructions TR1, TR2, TR3 at the same time to find out the abnormal accessing time of the slave devices (the nodes nS1, nS2, nS3). In FIG. 14, the Transfer Identification (TID), the Total Latency for a transaction (TTL), the latency for a Frist Address Transfer (FAR), the First Address Transfer (FAT) and the Address Bus Handover (ABH) of the slave devices (the nodes nS1, nS2, nS3), which are corresponded to sequence number 1, 2, 3, are displayed at the same time.

Figure 15:
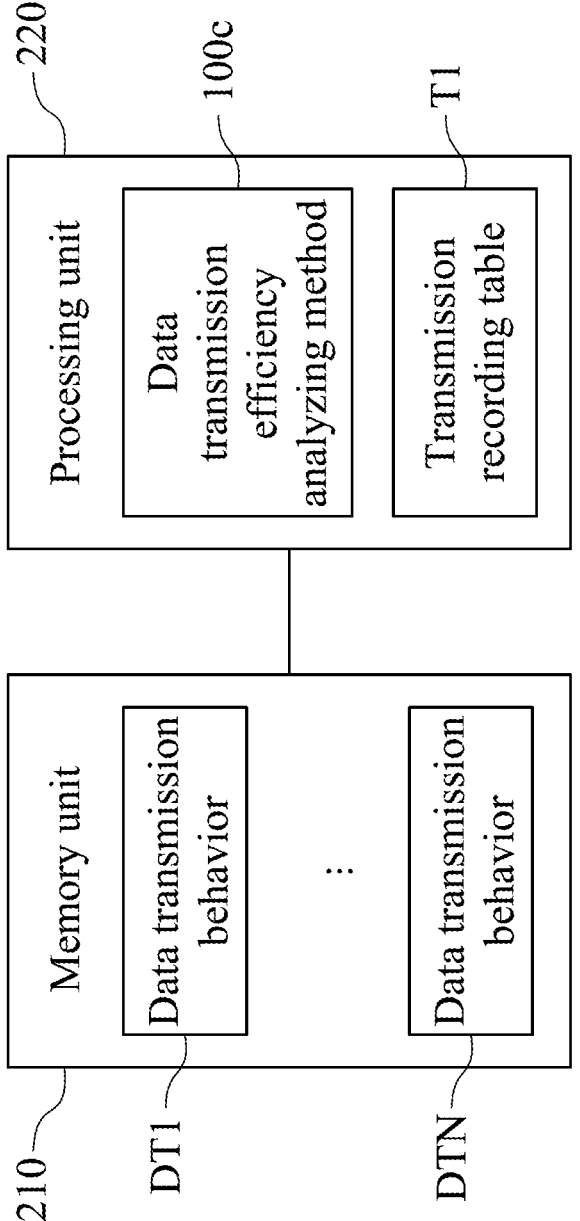
FIG. 15 shows a block diagram of a data transmission efficiency analyzing system according to a fourth embodiment of the present disclosure.
Figure 16:
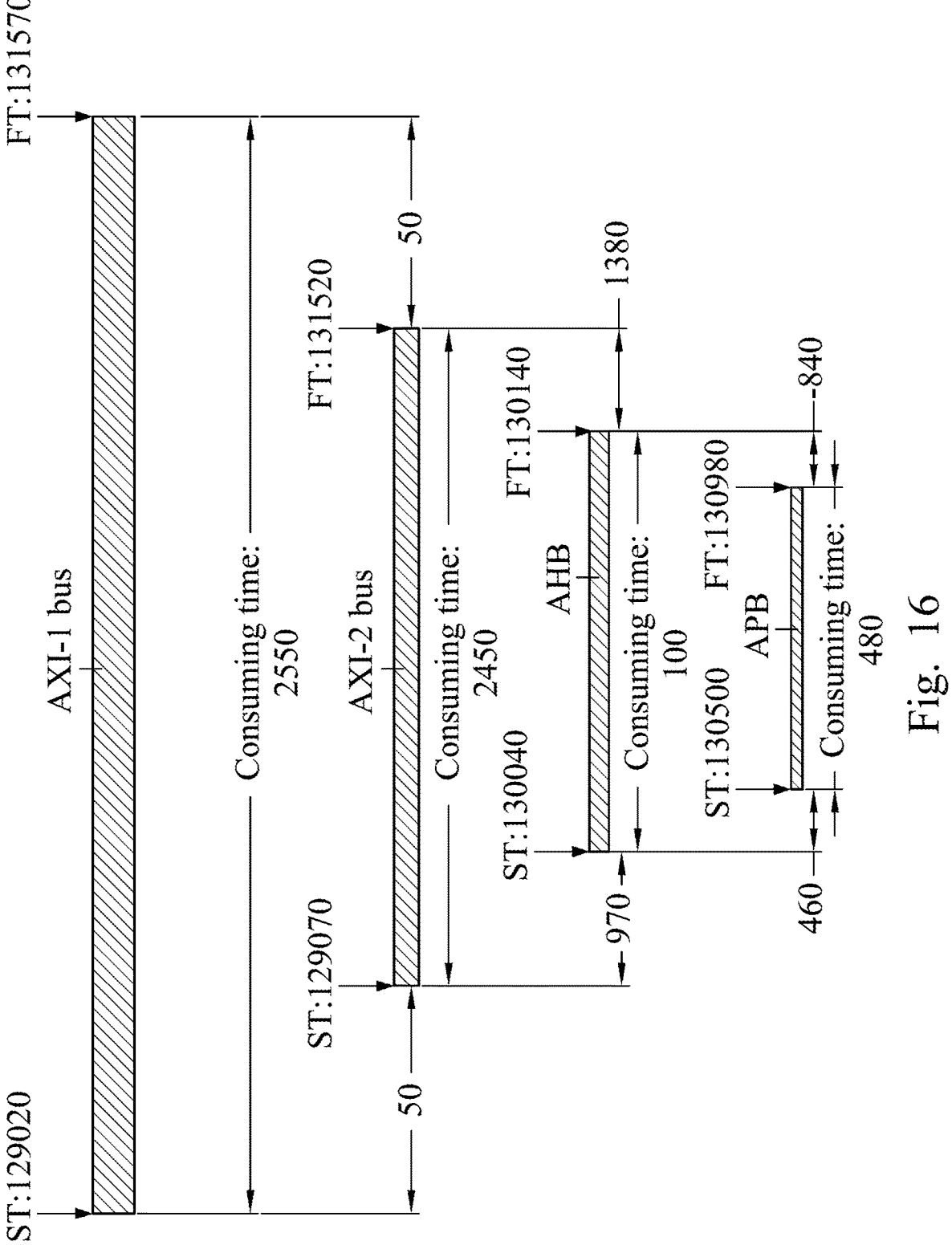
FIG. 16 shows a schematic view of a transmission efficiency of the data transmission efficiency analyzing system of FIG. 15.

Please refer to FIG. 1, FIG. 15 and FIG. 16. FIG. 15 shows a block diagram of a data transmission efficiency analyzing system 200 according to a fourth embodiment of the present disclosure. FIG. 16 shows a schematic view of a transmission efficiency of the data transmission efficiency analyzing system 200 of FIG. 15. The data transmission efficiency analyzing system 200 is configured to calculate a transmission efficiency of a transmission instruction. The data transmission efficiency analyzing system includes a memory unit 210 and a processing unit 220. The memory unit 210 is configured to store a plurality of data transmission behaviors (not shown) between a plurality of nodes. The nodes include an AXI-1 bus, an AXI-2 bus, an AHB and an APB. The processing unit 220 is connected to the memory unit 210, and configured to implement a data transmission efficiency analyzing method 100c. In the fourth embodiment, the data transmission efficiency analyzing method 100c can be the same as the data transmission efficiency analyzing method 100, the data transmission efficiency analyzing method 100a or the data transmission efficiency analyzing method 100b, and will not be described again.

In detail, the memory unit 210 can include a Random Access Memory (RAM) capable to store information and instruction for the processing unit 220 to process or other dynamic storing device, the processing unit 220 can include any type of processor, microprocessor, but the present disclosure is not limited thereto. Thus, the data transmission efficiency analyzing system 200 for the present disclosure can analyze an efficiency of the transmission instruction that crosses multiple nodes.

FIG. 16 shows a transmission instruction transmitting a data from the AXI-1 bus to the APB, which passing through the AXI-2 bus and the AHB, and also shows the transmitting starting time ST and the transmitting ending time FT of a data stream corresponding to each of the buses. The transmitting starting time ST of the AXI-1 bus is 129020 ns, and the data is transmitted to the AXI-2 bus after 50 ns. The transmitting starting time ST of the AXI-2 bus is 129070 ns, and the data is transmitted to the AHB after 970 ns. The transmitting starting time ST of the AHB is 130040 ns, and the data is transmitted to the APB after 460 ns. The APB returns the transmission completed reply to the AXI-1 bus in the aforementioned sequence. The transmitting ending time FT of the AXI-1 bus, the time when the AXI-1 bus receives the transmission completed reply, is 131570 ns. The total consuming time of the transmission instruction is 2550 ns.

A computer readable recording medium stores a program for a processing unit (not shown) capable of calculating a transmission efficiency of a transmission instruction, to execute the data transmission efficiency analyzing methods 100, 100a, 100b, 100c. The computer readable recording medium can be a CR-ROM, a flexible disk (FD), a CD-R, a digital versatile disk (DVD), a USB medium and a flash memory, but the present disclosure is not limited thereto.

According to the aforementioned embodiments and examples, the advantages of the present disclosure are described as follows.

1. The data transmission efficiency analyzing method of the present disclosure can compare the connecting port codes, the terminal node, the data transmission amount with the transmission instruction to calculate the transmission efficiency of a data transmission cross buses.
2. The data transmission efficiency analyzing method of the present disclosure can calculate the transmission efficiency in the AMBA, which has multiple data transmissions across different buses accurately.
3. The data transmission efficiency analyzing method of the present disclosure can analyze the efficiency of the target sections via the analyzing time assigning step, exclude the section, which don't need to be analyzed, to find out the problem section.
4. The data transmission efficiency analyzing system of the present disclosure can analyze an efficiency of the transmission instruction that crossed multiple nodes.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A data transmission efficiency analyzing method, which is configured to calculate a transmission efficiency of a transmission instruction, wherein the transmission instruction is configured to control a transmitting port to transmit a data to a receiving port along a transmission route at a transmitting time, the transmission route has a plurality of connecting port codes, the data transmission efficiency analyzing method comprising:

performing a recording step, wherein the recording step comprises configuring a processing unit to read or write a plurality of data transmission behaviors between a plurality of nodes from a memory unit, and generate a transmission recording table according to the data transmission behaviors, wherein the transmission recording table comprises each of the connecting port codes, a time value, a timestamp, a terminal node and a data transmission amount, which are corresponding to each of the data transmission behaviors;

performing a data stream storing step, wherein the data stream storing step comprises configuring the processing unit to store the data transmission behaviors into a plurality of queues according to the timestamp corresponding to each of the data transmission behaviors, and output one of a part of the data transmission behaviors of each of the queues in a first-in, first-out sequence to combine the one of the part of the data transmission behaviors of each of the queues into a data stream, and combine the data transmission behaviors of the queues into the data streams;

performing a comparing step, wherein the comparing step comprises configuring the processing unit to compare the connecting port codes, the time values, the terminal nodes and the data transmission amounts of the data transmission behaviors corresponding to each of the data streams with the transmitting port, the transmitting time, the receiving port and a data amount of the data transmitted by the transmission instruction to determine whether each of the data streams is corresponding to one of the connecting port codes or not; and performing an efficiency calculating step, wherein the efficiency calculating step comprises configuring the processing unit to store a part of the data streams, which is corresponding to the connecting port codes, to a register, and calculate the transmission efficiency of the transmission instruction according to the part of the data streams.

2. The data transmission efficiency analyzing method of claim 1, wherein the data stream storing step further comprises:

performing a data stream calculating step, wherein the data stream calculating step comprises configuring the processing unit to calculate a transmitting starting time and a transmitting ending time of each of the data streams according to the connecting port codes, the time values, the terminal nodes and the data transmission amount of the data transmission behaviors corresponding to each of the data streams.

3. The data transmission efficiency analyzing method of claim 1, wherein the comparing step further comprises:

performing a first determining step, wherein the first determining step comprises configuring the processing unit to determine whether at least one of the connecting port codes and the terminal nodes of the data transmission behaviors corresponding to one of the data streams is the same as at least one of the transmitting port and the receiving port of the transmission instruction, and determine whether a transmitting starting time of the one of the data streams is later than or the same as the transmitting time of the transmission instruction to generate a first determining result; and performing a second determining step, wherein the second determining step comprises configuring the processing unit to determine whether the data transmission amount of the one of the data streams is equal to the data amount of the data transmitted by the transmission instruction to generate a second determining result;

wherein in response to determine that the first determining result is true and the second determining result is true, the one of the data streams is the one of the connecting port codes.

4. The data transmission efficiency analyzing method of claim 3, wherein in response to determine that the first determining result is true and the second determining result is false, the comparing step further comprises:

performing a first temporary storing step, wherein the first temporary storing step comprises configuring the processing unit to store the one of the data streams into another register;

performing a repeat performing step, wherein the repeat performing step comprises configuring the processing unit to perform the first determining step and the second determining step to another one of the data streams;

performing a second temporary storing step, wherein the second temporary storing step comprises configuring the processing unit to store the another one of the data streams into the another register, when the first determining result corresponding to the another one of the data streams is true and the second determining result corresponding to the another one of the data streams is false; and performing a combining step, wherein the combining step comprise configuring the processing unit to calculate a sum of the data transmission amount in the another register, and determine whether the sum is the same as the data amount of the data;

wherein in response to determine that the sum is the same as the data amount of the data, the one of the data streams and the another one of the data streams are both the one of the connecting port codes.

5. The data transmission efficiency analyzing method of claim 3, wherein the transmission recording table further comprises a plurality of data addresses, and the second determining step further comprises:

configuring the processing unit to transform each of the data addresses of each of the nodes to a transformed address according to an address transforming algorithm, and determine whether the transformed address is in a predetermined range, wherein the predetermined range is described as follows:

$$F2\_addr \le t\_addr \le F2\_addr + F2\_size - 1;$$

wherein F2_addr is represented as a begin address of the receiving port, t_addr is represented as the transformed address, F2_size is represented as a memory width of the receiving port.

6. The data transmission efficiency analyzing method of claim 1, wherein the efficiency calculating step further comprises:

performing an analyzing time assigning step, wherein the analyzing time assigning step comprises configuring the processing unit to mark an assigning start time label and an assigning end time label between the time values corresponding to each of the data streams, and calculate a time difference corresponding to the assigning start time label and the assigning end time label to calculate the transmission efficiency of the transmission instruction.

7. The data transmission efficiency analyzing method of claim 1, further comprising:

performing a transmitting step, wherein the transmitting step comprises configuring at least one master device of the nodes to transmit the transmission instruction to a plurality of slave devices;

performing a selecting step, wherein the selecting step comprises configuring the processing unit to select at least one of the slave devices;

performing an analyzing step, wherein the analyzing step comprises configuring the processing unit to analyze at least one of the transmission instruction between the at least one master device and the at least one of the slave devices to generate an analyzing result; and performing a displaying step, wherein the displaying step comprises configuring the processing unit to display the analyzing result on a window.

8. A data transmission efficiency analyzing system, which is configured to calculate a transmission efficiency of a transmission instruction, wherein the transmission instruction is configured to control a transmitting port to transmit a data to a receiving port along a transmission route at a transmitting time, the transmission route has a plurality of connecting port codes, the data transmission efficiency analyzing system comprising:

a memory unit configured to store a plurality of data transmission behaviors between a plurality of nodes; and a processing unit signally connected to the memory unit, and configured to implement a data transmission efficiency analyzing method comprising:

performing a recording step, wherein the recording step comprises reading or writing the data transmission behaviors between the nodes, and generating a transmission recording table according to the data transmission behaviors, wherein the transmission recording table comprises each of the connecting port codes, a time value, a timestamp, a terminal node and a data transmission amount, which are corresponding to each of the data transmission behaviors;

performing a data stream storing step, wherein the data stream storing step comprises storing the data transmission behaviors into a plurality of queues according to the timestamp corresponding to each of the data transmission behaviors, and outputting one of a part of the data transmission behaviors of each of the queues in a first-in, first-out sequence to combine the one of the part of the data transmission behaviors into a data stream, and combining the data transmission behaviors of the queues into the data streams;

performing a comparing step, wherein the comparing step comprises comparing the connecting port codes, the time values, the terminal nodes and the data transmission amounts of the data transmission behaviors corresponding to each of the data streams with the transmitting port, the transmitting time, the receiving port and a data amount of the data transmitted by the transmission instruction to determine whether each of the data streams is corresponding to one of the connecting port codes or not; and performing an efficiency calculating step, wherein the efficiency calculating step comprises storing a part of the data streams, which is corresponding to the connecting port codes, to a register, and calculating the transmission efficiency of the transmission instruction according to the part of the data streams.

9. The data transmission efficiency analyzing system of claim 8, wherein the data stream storing step further comprises:

performing a data stream calculating step, wherein the data stream calculating step comprises calculating a transmitting starting time and a transmitting ending time of each of the data streams according to the connecting port codes, the time values, the terminal nodes and the data transmission amount of the data transmission behaviors corresponding to each of the data streams.

10. The data transmission efficiency analyzing system of claim 8, wherein the comparing step further comprises:

performing a first determining step, wherein the first determining step comprises determining whether at least one of the connecting port codes and the terminal nodes of the data transmission behaviors corresponding to one of the data streams is the same as at least one of the transmitting port and the receiving port of the transmission instruction, and determining whether a transmitting starting time of the one of the data streams is later than or the same as the transmitting time of the transmission instruction to generate a first determining result; and performing a second determining step, wherein the second determining step comprises determining whether the data transmission amount of the one of the data streams is equal to the data amount of the data transmitted by the transmission instruction to generate a second determining result;

wherein in response to determine that the first determining result is true and the second determining result is true, the one of the data streams is the one of the connecting port codes.

11. The data transmission efficiency analyzing system of claim 10, wherein in response to determine that the first determining result is true and the second determining result is false, the comparing step further comprises:

performing a first temporary storing step, wherein the first temporary storing step comprises storing the one of the data streams into another register;

performing a repeat performing step, wherein the repeat performing step comprises performing the first determining step and the second determining step to another one of the data streams;

performing a second temporary storing step, wherein the second temporary storing step comprises storing the another one of the data streams into the another register, when the first determining result corresponding to the another one of the data streams is true and the second determining result corresponding to the another one of the data streams is false; and performing a combining step, wherein the combining step comprise calculating a sum of the data transmission amount in the another register, and determining whether the sum is the same as the data amount of the data;

wherein in response to determine that the sum is the same as the data amount of the data, the one of the data streams and the one of the data streams are both the one of the connecting port codes.

12. The data transmission efficiency analyzing system of claim 10, wherein the transmission recording table further comprises a plurality of data addresses, and the second determining step further comprises:

transforming each of the data addresses of each of the nodes to a transformed address according to an address transforming algorithm, and determining whether the transformed address is in a predetermined range, wherein the predetermined range is described as follows:

$$F2\_addr \leq t\_addr \leq F2\_addr + F2\_size - 1;$$

wherein F2_addr is represented as a begin address of the receiving port, t_addr is represented as the transformed address, F2_size is represented as a memory width of the receiving port.

13. The data transmission efficiency analyzing system of claim 8, wherein the efficiency calculating step further comprises:

performing an analyzing time assigning step, wherein the analyzing time assigning step comprises marking an assigning start time label and an assigning end time label between the time values corresponding to each of the data streams, and calculating a time difference corresponding to the assigning start time label and the assigning end time label to calculate the transmission efficiency of the transmission instruction.

14. The data transmission efficiency analyzing system of claim 8, wherein the nodes comprise at least one master device and a plurality of slave devices, and the data transmission efficiency analyzing method further comprises:

performing a transmitting step, wherein the transmitting step comprises configuring the at least one master device to transmit the transmission instruction to each of the slave devices;

performing a selecting step, wherein the selecting step comprises selecting at least one of the slave devices;

performing an analyzing step, wherein the analyzing step comprises analyzing at least one of the transmission instruction between the at least one master device and the at least one of the slave devices to generate an analyzing result; and performing a displaying step, wherein the displaying step comprises displaying the analyzing result on a window.

15. A computer readable recording medium storing a program for a processing unit capable of calculating a transmission efficiency of a transmission instruction, wherein the transmission instruction is configured to control a transmitting port to transmit a data to a receiving port along a transmission route at a transmitting time, the transmission route has a plurality of connecting port codes, to execute a data transmission efficiency analyzing method comprising:

performing a recording step, wherein the recording step comprises configuring the processing unit to read or write a plurality of data transmission behaviors between a plurality of nodes from a memory unit, and generate a transmission recording table according to the data transmission behaviors, wherein the transmission recording table comprises each of the connecting port codes, a time value, a timestamp, a terminal node and a data transmission amount, which are corresponding to each of the data transmission behaviors;

performing a data stream storing step, wherein the data stream storing step comprises configuring the processing unit to store the data transmission behaviors into a plurality of queues according to the timestamp corresponding to each of the data transmission behaviors, and output one of a part of the data transmission behaviors of each of the queues in a first-in, first-out sequence to combine the one of the part of the data transmission behaviors into a data stream, and combine the data transmission behaviors of the queues into the data streams;

performing a comparing step, wherein the comparing step comprises configuring the processing unit to compare the connecting port codes, the time values, the terminal nodes and the data transmission amounts of the data transmission behaviors corresponding to each of the data streams with the transmitting port, the transmitting time, the receiving port and a data amount of the data transmitted by the transmission instruction to determine whether each of the data streams is corresponding to one of the connecting port codes or not; and performing an efficiency calculating step, wherein the efficiency calculating step comprises configuring the processing unit to store a part of the data streams, which is corresponding to the connecting port codes, to a register, and calculate the transmission efficiency of the transmission instruction according to the part of the data streams.

* * * * *